Patented Oct. 16, 1934

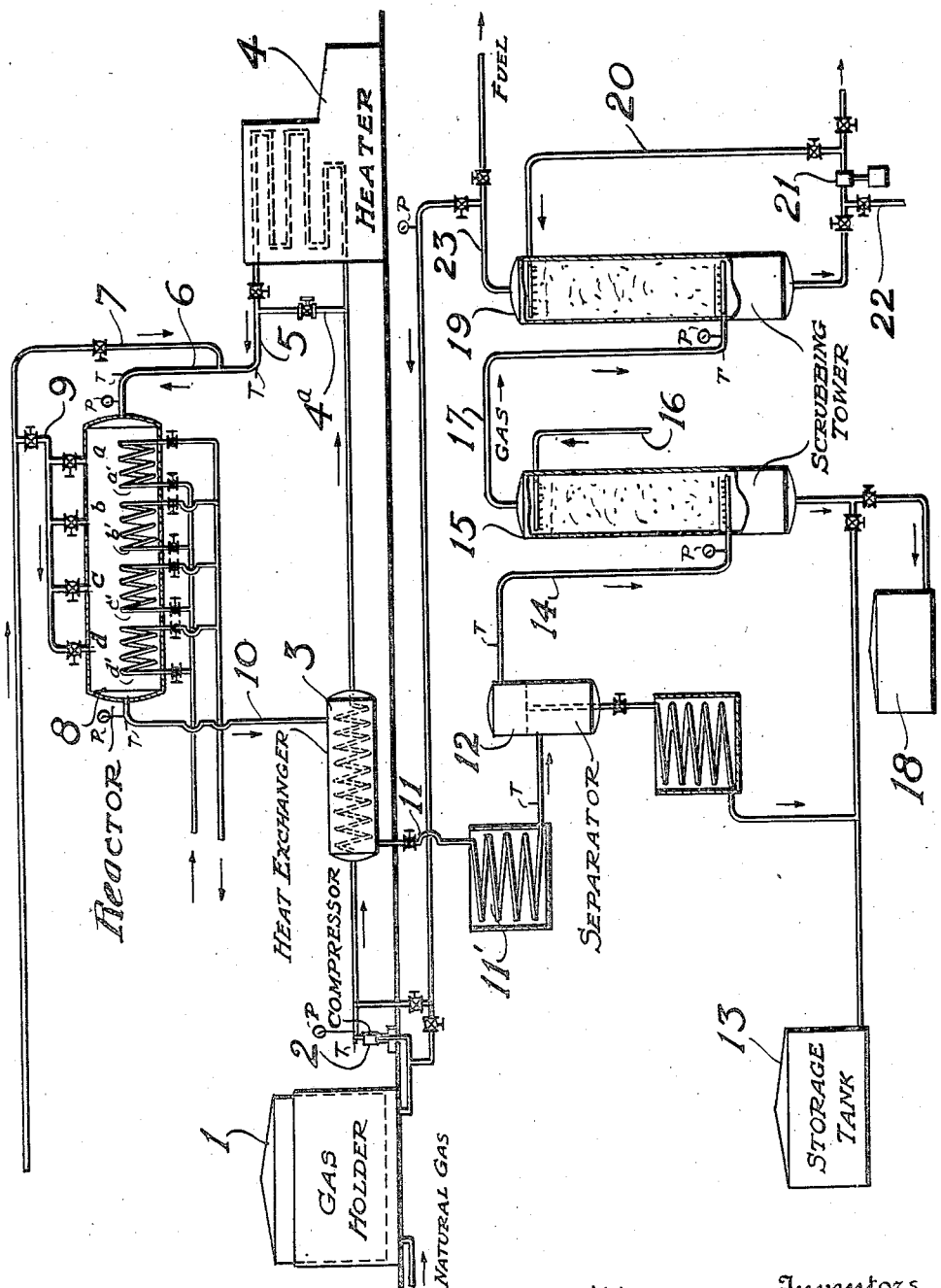

1,976,790

UNITED STATES PATENT OFFICE 1,976,790

PROCESS OF OXIDIZING HYDROCARBONS

Warren K. Lewis, Newton, and Per K. Frölich, Boston, Mass., assignors to Standard Oil Development Company, a corporation of Delaware Application May 12, 1927, Serial No. 190,728

2 Claims. (Cl. 260—156)

The present invention relates to the art of treating hydrocarbon materials to form valuable liquid products and more specifically to a method of oxidizing the gaseous and lower boiling hydrocarbons with air or other oxygen containing gas to form substantial quantities of alcohols, aldehydes, acids and other oxygen containing compounds. Our process and apparatus will be fully understood from the following description taken with the attached drawing which illustrates one form of apparatus suitable for carrying out our invention.

The drawing is a diagrammatic composite plan and elevation of an apparatus constructed according to our invention and showing the course of the material in the process.

In the drawing the reference character 1 designates a suitable source of hydrocarbon material which will be referred to as natural gas, although a pure hydrocarbon gas, or a mixture of two or more such gases or even low boiling hydrocarbon liquid may serve as the raw material in our process. The gas is drawn from holder 1 and compressed to a suitable pressure by a compressor 2 which may be of one or more stages. The compressed gas then flows through a heat exchanger 3 and a heater 4 in which the temperature is raised to a point somewhat below the temperature of the reactor hereinafter described. The heater 4 may be used only at the start of a run and the gases may be sent through a valved by-pass line 4a, if so desired.

The hot, compressed gas then flows through a valved line 5 into a mixing pipe 6 to which an oxygen containing gas from a compression apparatus (not shown) may be supplied by a valved line 7. The gases are thoroughly mixed by passage through pipe 6 and enter a reactor 8, which is preferably a shell of heavy metal adapted to withstand pressure in excess of 3,000 lbs. per square inch. The shell is made of steel and lined with copper or some other suitable material which will prevent the rapid oxidation of the metal. A part of the oxidizing gas before admixture with the natural gas may be passed through a line 9 and may enter the reactor 8 at points $a$, $b$, $c$, and $d$, in controlled quantities. Cooling coils $a'$, $b'$, $c'$, and $d'$, are disposed throughout the reactor to absorb the heat generated in the reaction. The reactor 8 may be otherwise empty or may be partially filled with a catalyst (not shown in the drawing), the nature of which will be disclosed below.

The hot products of oxidation leave the reactor 8 by a line 10 communicating with the heat exchanger 3 and furnish heat for preheating the natural gas. The oxidizing gas may also be preheated, if desired. The products of conversion passing from the heat exchanger 3 through the valved pipe 11 are further cooled in the condenser 11' in which a substantial part of the liquid oxidation products are condensed under full or reduced pressure. Liquid and residual gas are separated in the separator 12, the liquid flowing to storage tank 13 and gas flowing by line 14 to a scrubbing tower 15. Water is admitted to the top of the tower by line 16 and in passing through the tower dissolves the uncondensed oxidation products such as alcohols, aldehydes and acids from the gas, leaving a mixture of unoxidized natural gas, carbon dioxide, and carbon monoxide, which passes out of the top of the tower by line 17. It is advantageous to scrub the gas under superatmospheric pressure. The solution which is collected in tank 18 may be mixed with the condensate in tank 13 or each may be separately distilled and fractionated in apparatus (not shown) for purifying the various products of oxidation.

Gas leaving tower 15 is conducted to a second scrubbing tower 19 where carbon dioxide is removed by an alkaline solution which is admitted by line 20 and circulated through tower 19 by a pump 21. Sodium carbonate solution is suitable for this purpose and when it has lost its activity it may be removed by line 22 and replaced by a fresh charge. The gas now freed of carbon dioxide is removed by line 23 and may be either recirculated through the system or withdrawn for use as fuel. Throughout the apparatus thermometers are indicated by the letter "T" and pressure gages by "P".

In the operation of our process the natural gas is compressed to a pressure in excess of 100 lbs. per square inch, and preferably from 1,000 to 3,500 lbs. per square inch, which pressure is preferably maintained throughout the system. When liquid or easily liquefiable hydrocarbons are treated, it has been found advantageous to pump the liquid through exchanger 3 and into the mixing pipe 6. The oxidizing gas, which may be pure oxygen or oxygen mixed with other gas, is fed to pipe 6 or a part may be added directly to the reactor 8 in controlled quantities, at $a$, $b$, $c$, and $d$. Both the hydrocarbon gas and the oxidizing gas are fed to pipe 6 through valved lines with a slight reduction of pressure at the valves as a precautionary measure to prevent the possibility of backing up into the feed lines.

In pipe 6 the mixed gases are at a temperature slightly below that at which the reaction takes place and on passing into the reactor 8 the temperature immediately rises due to the heat generated during reaction. The temperature of the reactor depends in part on the nature of the catalyst used, each catalyst having a minimum temperature at which reaction proceeds with an appreciable rate. We prefer to operate at substantially this minimum temperature. Reaction may be started by heating somewhat above the preferred normal running temperature but, as we have stated, the reaction is exothermic and once the reaction is started, heat must be absorbed. Cooling coils $a'$, $b'$, $c'$ and $d'$ should be carefully disposed within the reactor and a cooling medium rapidly circulated through the coils to prevent local overheating.

We prefer to operate with an oxygen concentration of less than 15% by volume of the reactive mixture and with high concentration of oxygen it becomes especially important to prevent local overheating. Under certain circumstances it has been found advantageous to limit the concentration of oxygen to below 10%, in other cases to below 5%, since with low concentrations of oxygen there is less waste from the production of carbon monoxide and carbon dioxide.

The temperature of the reactor at which we prefer to operate depends on the specific catalyst, the hydrocarbon being oxidized and to a less extent on the rate of flow of the gas. Using a natural gas, comprising substantially a mixture of methane and ethane only, the following data are given, approximately, as the preferred reactor temperatures. In these experiments the methane passed without substantial change and the temperature represents that most suitable for the oxidation of ethane.

| Catalyst | Condition of catalyst | Reactor temperature ° C. |
|---|---|---|
| Vanadian pentoxide | Powder | 315 |
| Pyrex glass | Tube | 350 |
| Copper borax | Wire coated with salt | 340 |
| Sodium tungstate | Fused on copper wire | 380 |
| Silver | Wire spiral | 400 |
| Platinum | Foil | 365 |
| Brass | Tube | 365 |
| Nickel | Wire | 375–395 |
| Nickel | On pumice reduced from oxide | 260 |
| Iron | Wire | 410 |
| Cobalt | Plated on copper wire | 390 |
| Borax on iron | Borax fused on copper wire, sprinkled with iron powder. | 390 |
| Calcium | Tube | 390 |
| Manganese | Lump, size of pea | 360 |
| Steel | Tube | 365 |
| Clay | | 400 |
| Chromel | Wire | 330 |
| Aluminum | Wire | 425 |

All surfaces appear to act as catalysts to some degree but we prefer carbide forming metals, their oxides, metals associated with salts and compounds of silica. The interior walls of the reactor may often serve as a suitable and sufficient catalytic surface, although more surface may be gained by partially filling the reactor with additional catalytic material. The reactor temperature is dependent also on the hydrocarbon being oxidized; in general the lower the molecular weight of the hydrocarbon, the higher will be the reactor temperature using any given catalyst. The examples given below on different pure hydrocarbons using nickel catalysts illustrate this point. We have operated with temperatures as high as 600° C. but prefer lower temperatures.

The rate of flow of the gas is important in producing alcohols and other liquid oxidation products. We have expressed this flow in two ways. The "space velocity" is expressed in the units, cubic centimeters of gas, at standard conditions of temperature and pressure, per hour per cubic centimeter of reactor volume and this value should not be below 4,000. "Surface velocity" is expressed as cubic centimeters of gas, at standard conditions of temperature and pressure per hour per square centimeter of superficial catalytic surface. Calculated on this basis the "surface velocity" should be above 200 cubic centimeters per hour per square centimeter.

The following experimental runs are given as illustrative examples of our process.

*No. 1.*—A sample of commercial methane was carefully purified until it contained less than .40% of ethane and higher hydrocarbons by analysis. This gas was mixed with pure oxygen, the mixture containing 6.8% of oxygen, and was passed once through a reactor under 2,000 lbs. per square inch pressure over a nickel wire catalyst. The "space velocity" was approximately 7,200 cubic centimeters per cubic centimeter, as defined above, and the "surface velocity" about 680 cubic centimeters per square centimeter. Reaction was noted at 520° C. and proceeded rapidly at 585° C. Approximately 132 litres of the methane yielded 8.5 cubic centimeters of a liquid of .97 specific gravity at 60° F. and which was fractionated and gave the following analysis:

| Boiling point | Percent | Composition |
|---|---|---|
| 60° to 70° C | 20 | Substantially all methanol |
| 70° to 92° C | 3.5 | Ethanol, propanol, and water |
| 92° to 100° C | 1.0 | 10% formic acid and 90% water |
| 100° | 75.5 | Water |

The exit gas contained .8% $CO_2$; .3% $O_2$; 1.4% CO; 1.6% $H_2$, together with unconverted methane. Calculation shows that approximately 5.7% of the oxygen went into liquid, organic oxidation products.

*No. 2.*—Commercial methane was mixed with ethane until the mixture contained approximately 20% ethane. The run was made as in No. 1 with pressure of 2,000 lbs. per square inch, temperature of 395° C., oxygen concentration of 5.6% and using a nickel wire catalyst. The "space velocity" was 7,350 and "surface velocity" 650 as disclosed. A liquid product, approximately 10.8 cubic centimeters per 100 litres of gas, was obtained, which product had the following composition by fractionation and analysis:

| Boiling point | Percent | Composition |
|---|---|---|
| Below 25° C | 1.0 | Acetaldehyde |
| 25° C. to 50° C | 1.0 | Approximately 50% acetaldehyde, 50% acetone |
| 50° C. to 60° C | 4.0 | Acetone |
| 60° C. to 70° C | 39.0 | Methanol |
| 70° C. to 78° C | 5.0 | 95% ethanol and 5% water |
| 78° C. to 92° C | 6.0 | Unidentified |
| 92° C. to 100° C | 1.0 | 10% formic acid and 90% water |
| 100° C | 43.0 | Water |

In this case the exit gas contained 1.9% $CO_2$, 0.3% $O_2$, 2.3% CO, 1.3% $H_2$ and the remainder unconverted hydrocarbons.

*No. 3.*—A sample of substantially pure propane was run over a nickel wire catalyst at 380° C. and under 500 lbs. per square inch pressure. The oxygen concentration was 5.3 in the entering gas and a product was collected at a rate of 8.03 cubic centimeters per 100 litres of gas which on fractionation and analysis showed the following composition:

| Boiling point | Percent | Composition |
|---|---|---|
| Below 25° C | 6.0 | Acetaldehyde. |
| 25° C. to 50° C | 9.0 | 50% acetaldehyde, 50% acetone. |
| 50°C. to 60° C | 19.0 | Acetone. |
| 60° C. to 70° C | 10.0 | Methanol. |
| 70° C. to 78° C | 29.0 | 95% ethanol and 5% water. |
| 78° C. to 92° C | 9.0 | 78% propanol and 22% water. |
| 92° C. to 100° C | 12.0 | 10% formic acid, and water. |
| 100° C | 6.0 | Water. |

The "surface velocity" was 980 and the "space velocity" 10,300 as disclosed. Approximately 31.4% of the oxygen went to organic liquid oxidation products and the combined CO and $CO_2$ in the exit gas was 2.3%.

No. 4.—A second sample of propane was run over the same catalyst and under "space" and "surface" velocities equal to those used in No. 3. The pressure was 2,000 lbs. per square inch and a temperature of 298° C. was maintained. The percent of oxygen was held at 1.2% of the inlet gas and approximately 1.8 cubic centimeters of liquid was obtained per 100 litres of gas. The liquid was analyzed and results obtained below.

| Boiling point | Percent | Composition |
|---|---|---|
| Below 25° C | 0.0 | Acetaldehyde. |
| 25° C. to 50° C | 3.0 | 50% acetaldehyde, 50% acetone. |
| 50° C. to 60° C | 3.0 | Acetone. |
| 60° C. to 70° C | 22.0 | Methanol. |
| 70° C. to 78° C | 37.0 | 95% ethanol and 5% water. |
| 78° C. to 92° C | 7.0 | 78% propanol and 22% water. |
| 92° C. to 100° C | 13.0 | 10% formic acid, and water. |
| 100° C | 15.0 | Water. |

In this case 43.0% of the oxygen went into the formation of liquid organic oxidation products and the exit gas contained about .3% of CO and $CO_2$ combined.

No. 5.—A third sample of propane was run at a temperature of 372° C. with 10.3% by volume of oxygen in the inlet gas and with a pressure of 2,400 lbs. per square inch. The "surface" and "space" velocities were 1,820 and 19,200 respectively in the units disclosed above. The product had a specific gravity of .90 at 60° F. and 17.8 cubic centimeters were obtained per 100 litres of gas fed. The product had the following analysis.

| Boiling point | Percent | Composition |
|---|---|---|
| 25° C. to 50° C | 4.0 | 50% acetaldehyde, 50% acetone. |
| 50° C. to 60° C | 11.0 | Acetone. |
| 60° C. to 70° C | 9.0 | Methanol. |
| 70° C. to 78° C | 29.0 | 95% ethanol and 5% water. |
| 78° C. to 92° C | 16.0 | 78% propanol and 22% water. |
| 92° C. to 100° C | 5.0 | 10% formic acid, and water. |
| 100° C | 26.0 | Water. |

In this run 24.9% of the oxygen went to form liquid, organic oxidation products and the combined percentage of $CO_2$ and CO was 2.75% of the outlet gas.

No. 6.—A carefully purified sample of butane was passed through the catalytic chamber using nickel as a catalyst. Pure oxygen was supplied at a rate of 6.1% of the inlet mixture and the temperature was held at approximately 350° C. Pressure of 2,000 lbs. per square inch was maintained. "Space" and "surface" velocities were respectively 40,900 and 3,890 in the units disclosed. A liquid was obtained of the following composition and at a rate of 12.0 cubic centimeters per 100 litres of butane (gas).

| Boiling point | Percent | Composition |
|---|---|---|
| Up to 53° C | 3.0 | 50% acetaldehyde, 50% propionaldehyde. |
| 53° C. to 60° C | 1.0 | Acetone. |
| 60° C. to 70° C | 2.0 | Methanol. |
| 70° C. to 78° C | 11.0 | 95% ethanol, 5% water. |
| 78° C. to 89° C | 40.0 | 78% propanol, 22% water. |
| 89° C. to 96° C | 5.0 | 63% butanol, 37% water. |
| 96° C. up | 38.0 | 49.0% acetic acid. 5.4% propyl acetate. 45.6% water. |

In this run approximately 39.9% of the oxygen went to the formation of liquid, organic oxidation products and the combined quantity of CO and $CO_2$ in the exit gas was 2.1%.

From the foregoing description and examples it will be observed that the preferred limits of velocity are: Space velocity between about 4,000 and 40,900 in the units defined above, and surface velocity between about 650 and 3,890 in said units.

Our invention is not to be limited to any theory as to the mechanism of the oxidation nor to any specific example which may be included merely for purposes of illustration but only by the following claims, in which we claim all novelty inherent in the invention as allowed by the prior art.

We claim:

1. An improved process for the production of liquid oxidation products containing a substantial amount of alcohol from an aliphatic hydrocarbon, comprising passing such hydrocarbon with a gas containing free oxygen through a reaction zone at a pressure of about 100 to 3,500 pounds per square inch and at temperature between about 260° C. and about 600° C., maintaining a rate of flow between about 4,000 and 40,900 cubic centimeters of the mixture measured at standard conditions of temperature and pressure per hour per cubic centimeter of reaction volume, and keeping the oxygen concentration in the reaction mixture below 15%.

2. Process according to claim 1 in which a catalyst is used in the reaction zone and the surface velocity is between about 650 and 3,890 cubic centimeters of the mixture measured at standard conditions of temperature and pressure per hour per square centimeter of superficial catalytic surface.

WARREN K. LEWIS.
PER K. FRÖLICH.